(12) United States Patent
Maeda et al.

(10) Patent No.: US 7,997,155 B2
(45) Date of Patent: Aug. 16, 2011

(54) LOAD SENSOR

(75) Inventors: Ryoichi Maeda, Miyagi-ken (JP);
Yoshiharu Terauchi, Miyagi-ken (JP);
Tekayuki Norimatsu, Shizuoka-ken
(JP); Kentaro Nishikawa, Shizuoka-ken
(JP)

(73) Assignees: ALPS Electric Co., Ltd., Tokyo (JP);
NTN Corporation, Osaka (JP)

( * ) Notice: Subject to any disclaimer, the term of this patent is extended or adjusted under 35 U.S.C. 154(b) by 0 days.

(21) Appl. No.: 12/818,714

(22) Filed: Jun. 18, 2010

(65) Prior Publication Data

US 2010/0251834 A1 Oct. 7, 2010

Related U.S. Application Data

(63) Continuation of application No. PCT/JP2008/073441, filed on Dec. 24, 2008.

(30) Foreign Application Priority Data

Dec. 27, 2007 (JP) ................................. 2007-335782
Dec. 27, 2007 (JP) ................................. 2007-335783

(51) Int. Cl.
*G01L 3/02* (2006.01)
(52) U.S. Cl. ................................................. 73/862.627
(58) Field of Classification Search ............ 73/760–860, 73/862.627; 7/862.627
See application file for complete search history.

(56) References Cited

U.S. PATENT DOCUMENTS

| | | | | |
|---|---|---|---|---|
| 3,849,874 A * | 11/1974 | Jeffers | ............................. | 438/50 |
| 4,478,089 A * | 10/1984 | Aviles et al. | ............. | 73/862.044 |
| 4,918,833 A * | 4/1990 | Allard et al. | ................. | 29/621.1 |
| 5,079,535 A * | 1/1992 | Neuman et al. | .................... | 338/2 |
| 5,224,384 A * | 7/1993 | Kremidas et al. | ............... | 73/721 |
| 5,369,875 A * | 12/1994 | Utsunomiya et al. | ........ | 29/621.1 |
| 5,404,016 A * | 4/1995 | Boyd et al. | ..................... | 250/352 |
| 5,837,946 A * | 11/1998 | Johnson et al. | ............... | 177/136 |
| 5,959,214 A * | 9/1999 | Vaidyanthan et al. | .......... | 73/777 |
| 6,109,115 A * | 8/2000 | Miyazaki | ......................... | 73/794 |
| 6,329,828 B1 * | 12/2001 | Farnworth et al. | ............ | 324/755 |
| 6,467,361 B2 * | 10/2002 | Rainey et al. | ............ | 73/862.637 |
| 6,512,510 B1 * | 1/2003 | Maeda | .......................... | 345/168 |
| 7,490,523 B2 * | 2/2009 | Sakamoto et al. | ........ | 73/862.391 |
| 7,784,363 B2 * | 8/2010 | Ihrke et al. | ............... | 73/862.041 |
| 2002/0059835 A1 | 5/2002 | Miyazaki et al. | | |

FOREIGN PATENT DOCUMENTS

| | | |
|---|---|---|
| JP | 5-57605 | 7/1993 |
| JP | 2002-131152 | 5/2002 |
| JP | 2002-139373 | 5/2002 |
| JP | 2003-4553 | 1/2003 |
| JP | 2003-294520 | 10/2003 |
| JP | 2007-292159 | 11/2007 |

OTHER PUBLICATIONS

Search Report dated Apr. 7, 2009 from International Application No. PCT/JP2008/073441.

* cited by examiner

*Primary Examiner* — Max Noori
(74) *Attorney, Agent, or Firm* — Beyer Law Group LLP

(57) ABSTRACT

A load sensor includes a base substrate having two holes as two fixing portions to a frame member as a detection object, a pair of strain detecting elements provided on a surface of the base substrate, and input-output terminals provided on the surface of the base substrate. The strain detecting elements are arranged in a region that is between the holes and is opposite the input-output terminals with respect to at least one of the holes.

9 Claims, 5 Drawing Sheets

LOAD SENSOR

CLAIM OF PRIORITY

This application is a Continuation of International Application No. PCT/JP2008/073441 filed on Dec. 24, 2008, which claims benefit of Japanese Patent Application No. 2007-335782 filed on Dec. 27, 2007 and No. 2007-335783 filed on Dec. 27, 2007. The entire contents of each application noted above are hereby incorporated by reference.

BACKGROUND OF THE INVENTION

1. Field of the Invention

The present invention relates to load sensors, and more particularly to a load sensor suitable for detecting a load that is applied to a detection object when it is difficult to directly attach a strain detecting member to the detection object.

2. Description of the Related Art

For example, Japanese Unexamined Patent Application Publication No. 2003-294520 discloses a load sensor including a sensor plate that is elastically deformed when a load is applied thereto, and a plurality of strain detecting elements (strain gauges) fixed to a surface of the sensor plate. When a load is applied to the load sensor, the sensor plate is elastically deformed in accordance with the applied load. Thus, the load sensor determines a tensile stress and a compressive stress applied to the strain detecting elements and detects the applied load.

In recent years, since the size of a detection object is decreased and a detection object having a complicated shape is selected, the size of the load sensor is desired to be decreased. In addition, since control that is performed on the basis of the detected load becomes complex, the load sensor is desired to accurately detect the load applied to the detection object.

To decrease the size of the load sensor of related art, the size of the sensor plate has to be decreased. When the size of the sensor plate is decreased, the distance between the input-output terminal and the strain detecting elements provided on the sensor plate may be insufficient. In this case, if a stress is applied to the input-output terminal by, for example, wiring work, detection accuracy of the strain detecting element may be degraded.

SUMMARY OF THE INVENTION

The present invention provides a load sensor that prevents degradation in detection accuracy, the degradation which may occur due to a stress applied to an input-output terminal, from occurring and provides high detection accuracy while the size of the load sensor is decreased.

A load sensor according to an aspect of the invention includes a base substrate having at least two fixing portions to a detection object; a strain detecting element provided on a surface of the base substrate; and an input-output terminal provided on the surface of the base substrate. The strain detecting element is arranged in a region that is between the fixing portions and is opposite the input-output terminal with respect to at least one of the fixing portions.

With this configuration, the base substrate is fixed to the detection object at at least two positions, and the strain detecting element is arranged in the region between the fixing portions. The base substrate is fixed such that a portion of the detection object subjected to the detection of strain (a strain detection portion) is arranged between the fixing portions. Accordingly, a load equivalent to a load that is applied to the strain detection portion of the detection object is applied to the base substrate, and the strain detecting element can detect the load applied to the base substrate. Also, the input-output terminal is arranged in the region opposite the strain detecting element with respect to the at least one of the fixing portions. Accordingly, the strain detecting elements can detect the load applied to the base substrate while a stress applied to the input-output terminal does not affect the strain detecting element. As a result, the distance between the input-output terminal and the strain detecting element can be decreased, and degradation in detection accuracy of the strain detecting element, the degradation which may occur due to the stress applied to the input-output terminal, can be prevented from occurring. Thus, high detection accuracy can be provided while the size of the sensor is decreased.

Preferably, the load sensor may further include a reference resistance element provided on the surface of the base substrate and forming a bridge circuit together with the strain detecting element. The reference resistance element may be arranged in a region that is outside the fixing portions and is opposite the input-output terminal with respect to the fixing portions. In this case, the base substrate is fixed such that the portion of the detection object subjected to the detection of strain (the strain detection portion) is arranged between the fixing portions. Accordingly, the load equivalent to the load that is applied to the strain detection portion of the detection object is applied to the base substrate, and the bridge circuit can output an output voltage in accordance with the load applied to the detection object. Since the reference resistance element is arranged in the region outside the fixing portions, the reference resistance element can provide a reference resistance value while the load applied to the detection object does not affect the reference resistance element. Also, since the reference resistance element is arranged in the region opposite the input-output terminal with respect to the fixing portions, the reference resistance element can provide a reference resistance value while the stress applied to the input-output terminal does not affect the reference resistance element.

Preferably, in the load sensor, the strain detecting element, the input-output terminal, and the reference resistance element may be formed by screen printing. In this case, the bridge circuit including the strain detecting element and the reference resistance element can be easily formed on the base substrate.

Preferably, in the load sensor, the base substrate may include a bent portion, and two surfaces facing the detection object and arranged with the bent portion interposed therebetween. The fixing portions may be provided at the two surfaces at least one by one. The strain detecting element, the input-output terminal, and the reference resistance element may be provided on one of the two surfaces. In this case, the base substrate having the two surfaces with the bent portion interposed therebetween is fixed to the detection object by both surfaces. Accordingly, a load equivalent to a load that is applied to the detection object having a bent shape is applied to the base substrate, and the strain detecting element can detect the load applied to the base substrate.

Preferably, in the load sensor, the strain detecting element may be arranged in a region near the bent portion. The reference resistance element may be arranged in a region opposite the bent portion with respect to the fixing portion. In this case, the strain detecting element is arranged in the region near the bent portion. The surface with the strain detecting element is fixed to a portion of the detection object subjected to the detection of strain (a strain detection portion). Accordingly, the load applied to the strain detection portion of the detection object can be accurately transmitted to the base substrate. Also, since the reference resistance element is arranged in the region opposite the bent portion with respect to the fixing portion, the reference resistance element can provide a reference resistance value in the bridge circuit while the load applied to the detection object does not affect the reference resistance element.

Preferably, in the load sensor, the base substrate may have a substantially L-like shape. In this case, the base substrate can be fixed to the detection object having a substantially L-like shape. Accordingly, the load applied to the detection object having the substantially L-like shape can be properly detected.

Preferably, the load sensor may further include a thermistor on the same surface as the surface with the strain detecting element, the input-output terminal, and the reference resistance element. In this case, the correction calculation for the load is performed in accordance with the temperature detected by the thermistor provided on the same surface as the surface with the strain detecting element that detects the load applied to the detection object. Thus, the load applied to the detection object can be accurately detected.

DESCRIPTION OF THE PREFERRED EMBODIMENTS

Embodiments of the present invention will be described below with reference to the attached drawings. A load sensor according to any of the embodiments is arranged on, for example, a portion like a frame in a vehicle, the portion which likely receives a load. The load sensor detects the applied load. A detection object with the load sensor according to any of the embodiments is not particularly limited to an object in a specific field, and may be appropriately selected.

First Embodiment

Figure 1:
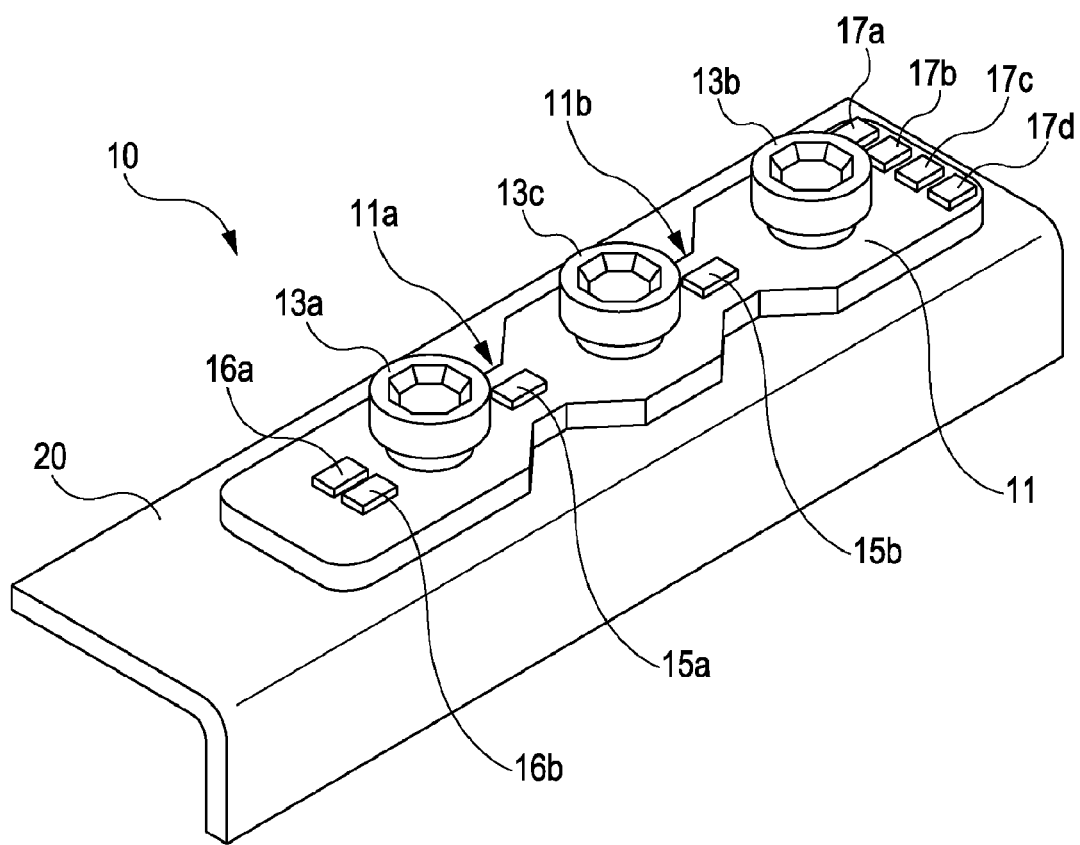
FIG. 1 is a perspective view showing a configuration of a load sensor according to a first embodiment of the invention.
Figure 2A:
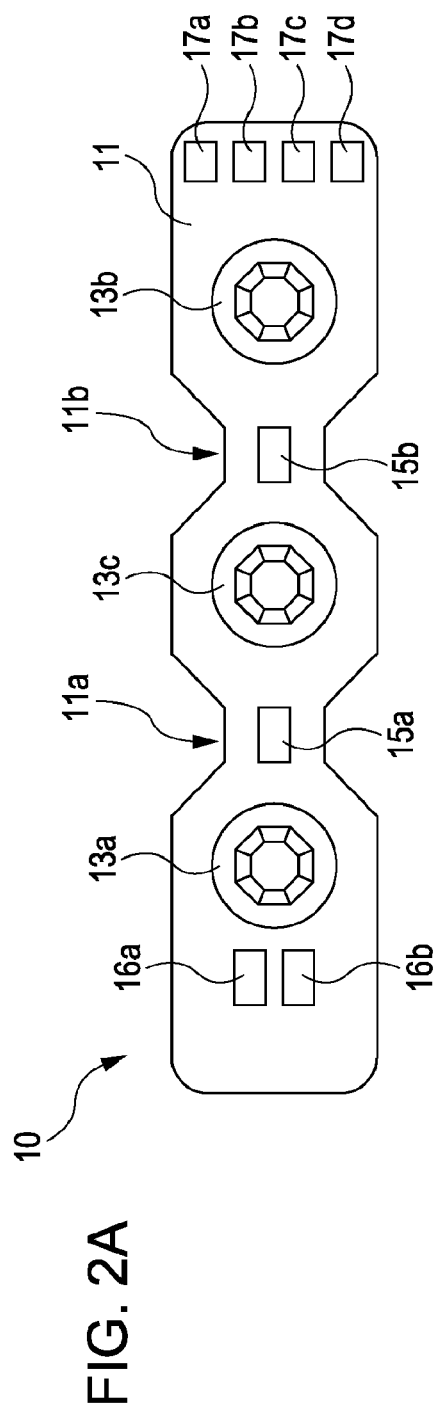
FIG. 2A is a top view showing the load sensor according to the first embodiment.
Figure 2B:
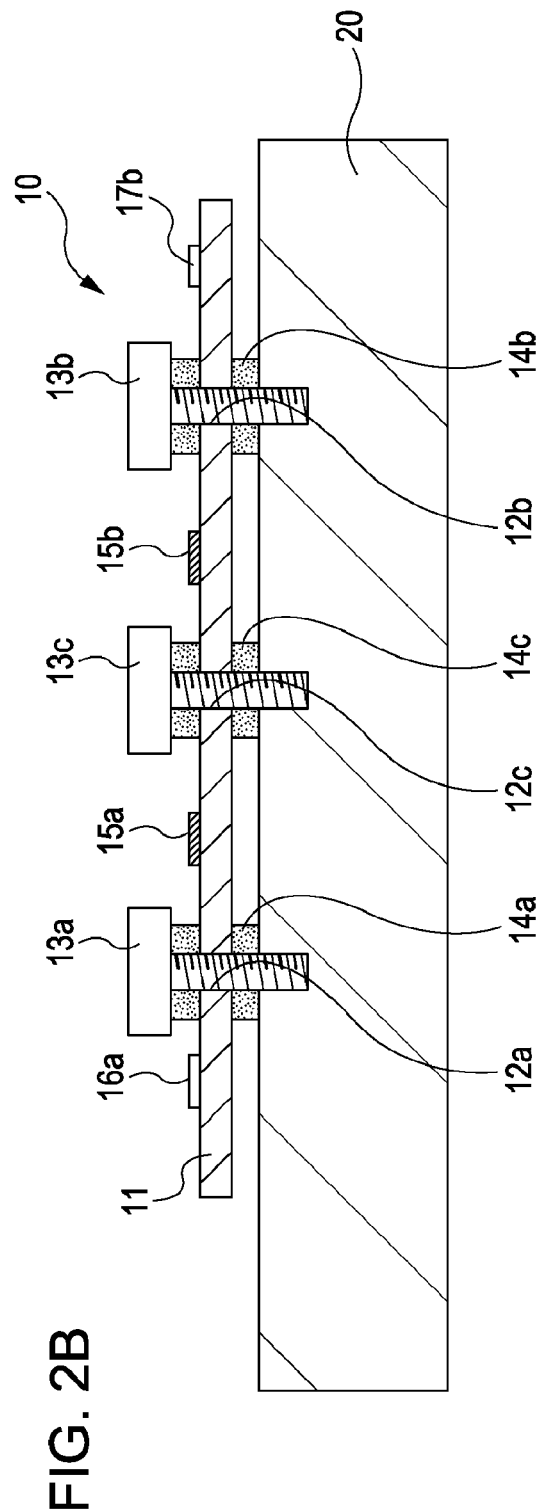
FIG. 2B is a longitudinal section showing the load sensor according to the first embodiment.

FIG. 1 is a perspective view showing a configuration of a load sensor 10 according to a first embodiment of the invention. FIG. 2A is a top view showing the load sensor 10 according to the first embodiment. FIG. 2B is a longitudinal section showing the load sensor 10 according to the first embodiment. FIGS. 1 and 2B illustrate a frame member 20 for the convenience of description. The frame member 20 serves as a detection object. The load sensor 10 is fixed to the frame member 20. FIG. 2B illustrates a section cut along the centers of screws 13a to 13c (described later).

Referring to FIG. 1, the load sensor 10 of this embodiment includes a base substrate 11 that is fixed to the frame member 20. For example, the base substrate 11 is formed by processing a flat plate of a stainless steel (SUS) material so that the plate has a predetermined shape and by coating the surface of the plate with glass. Since the surface of the stainless steel material is coated with glass, the base substrate 11 can be heat resistant while being elastic. The base substrate 11 has three holes 12a to 12c (not shown in FIG. 1, see FIG. 2B). The holes 12a to 12c serve as fixing portions to the frame member 20. The holes 12a to 12c are formed in a line that extends along a long side of the base substrate 11 and that is located substantially at the center of a short side of the base substrate 11.

The hole 12a is formed inside a left end portion of the base substrate 11 shown in FIG. 2A. The hole 12b is formed inside a right end portion shown in FIG. 2A. The hole 12c is formed substantially at the center of the base substrate 11. Also, the base substrate 11 includes a narrow portion 11a that is formed between the hole 12a and the hole 12c, and a narrow portion 11b that is formed between the hole 12c and the hole 12b. The narrow portions 11a and 11b have a smaller width than the other portions of the base substrate 11. The narrow portions 11a and 11b are formed to allow the base substrate 11 to be easily bent in accordance with a load that is applied to the frame member 20.

The base substrate 11 with this configuration is fixed to the frame member 20 by screws 13a to 13c through the holes 12a to 12c at three positions. Referring to FIG. 2B, spacers 14a to 14c are disposed between the base substrate 11 and the frame member 20, and between the base substrate 11 and heads of the screws 13a to 13c. The spacers 14a to 14c are disposed to separate the base substrate 11 from the frame member 20 by a certain distance, or to prevent the base substrate 11 from being damaged by the screws 13a to 13c.

For example, in the load sensor 10 according to this embodiment, the base substrate 11 is fixed such that portions of the frame member 20 subjected to the detection of strain (hereinafter, referred to as strain detection portions) are arranged between the fixing portions (in particular, between the hole 12a and the hole 12c, and between the hole 12c and the hole 12b). Since the base substrate 11 is fixed such that the strain detection portions of the frame member 20 are arranged between the fixing portions, the base substrate 11 is deformed with the frame member 20 because the state of the frame member 20 around the strain detection portions is reflected to the base substrate 11. Thus, when a load is applied to the strain detection portions of the frame member 20, a load equivalent to the load that is applied to the strain detection portions is applied to the base substrate 11.

A pair of strain detecting elements 15a and 15b, a pair of reference resistance elements 16a and 16b, and four input-output terminals 17a to 17d are provided on a surface of the base substrate 11 (a surface opposite the frame member 20 shown in FIGS. 1 to 2B). The strain detecting element 15a is arranged in a region between the hole 12a and the hole 12c of the base substrate 11, at a position corresponding to the small-width portion that is defined by the narrow portion 11a. The strain detecting element 15b is arranged in a region between the hole 12c and the hole 12b of the base substrate 11, at a position corresponding to the small-width portion that is defined by the narrow portion 11b. The pair of reference resistance elements 16a and 16b are arranged in a region outside the holes 12a to 12c. More specifically, the reference resistance elements 16a and 16b are vertically arranged in a left region of the hole 12a as shown in FIG. 2A. The input-output terminals 17a to 17d are arranged in a region opposite the pair of strain detecting elements 15a and 15b and the pair of reference resistance elements 16a and 16b with respect to at least one of the holes 12a to 12c. More specifically, the input-output terminals 17a to 17d are vertically arranged in a right region of the hole 12b as shown in FIG. 2A.

Figure 3:
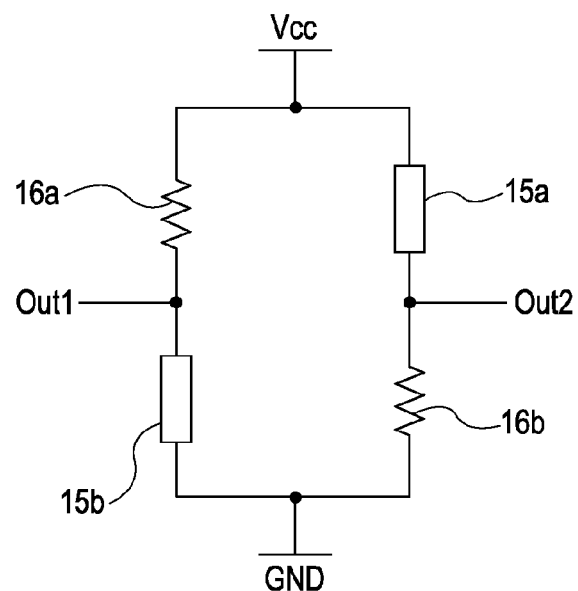
FIG. 3 is a configuration diagram of a bridge circuit that is formed on a base substrate of the load sensor according to the first embodiment.

FIG. 3 is a configuration diagram of a bridge circuit that is formed on the base substrate 11 of the load sensor 10 according to the first embodiment. Referring to FIG. 3, the pair of strain detecting elements 15a and 15b, the pair of reference resistance elements 16a and 16b, and the input-output terminals 17a to 17d are connected by bridge connection, and form a bridge circuit. In particular, the strain detecting element 15a is connected in series with the reference resistance element 16b, and the strain detecting element 15b is connected in series with the reference resistance element 16a. The strain detecting element 15a and the reference resistance element 16b are connected in parallel with the strain detecting element 15b and the reference resistance element 16a, with a supply voltage Vcc and a ground GND interposed therebetween. An output terminal Out1 is drawn from a node between the strain detecting element 15b and the reference resistance element 16a. An output terminal Out2 is drawn from a node between the strain detecting element 15a and the reference resistance element 16b. In this embodiment, the input-output terminal 17a corresponds to the supply voltage Vcc, the input-output terminal 17b corresponds to the ground GND, the input-output terminal 17c corresponds to the output terminal Out1, and the input-output terminal 17d corresponds to the output terminal Out2.

The components and wiring in the bridge circuit are formed on the base substrate 11. In particular, in the load sensor 10 according to this embodiment, the components and wiring in the bridge circuit may be formed on the base substrate 11 by screen printing. Since the components and wiring in the bridge circuit are formed on the base substrate 11 by screen printing, the bridge circuit can be easily formed on the base substrate 11.

In the load sensor 10 with this configuration, for example, if a load is applied to the frame member 20, the load is transmitted to the base substrate 11 through the screws 13a to 13c. Since the pair of strain detecting elements 15a and 15b are respectively arranged in the region between the hole 12a and the hole 12c and the region between the hole 12c and the hole 12b, a compressive stress or a tensile stress in accordance with the load applied to the frame member 20 is applied to the strain detecting elements 15a and 15b. Meanwhile, since the pair of reference resistance elements 16a and 16b are arranged in the region outside the holes 12a to 12c (in the left region of the hole 12a as shown in FIG. 2A), a compressive stress or a tensile stress in accordance with the load applied to the frame member 20 is not applied to the reference resistance element 16a or 16b. Accordingly, output voltages from the output terminals Out1 and Out2 in the bridge circuit shown in FIG. 3 vary in accordance with the compressive stress or the tensile stress applied to the pair of strain detecting elements 15a and 15b. That is, the output voltages from the bridge circuit vary in accordance with the load applied to the frame member 20 with the load sensor 10 fixed thereto.

The input-output terminals 17a to 17d are arranged in the region opposite the pair of strain detecting elements 15a and 15b and the pair of reference resistance elements 16a and 16b with respect to the at least one of the holes 12a to 12c (in the right region of the hole 12c as shown in FIG. 2A). Accordingly, a stress applied to the input-output terminals 17a to 17d by, for example, wiring work does not affect the strain detecting element 15a or 15b, or the reference resistance element 16a or 16b.

As described above, in the load sensor 10 according to the first embodiment, the base substrate 11 is fixed to the frame member 20 at the three positions, and the pair of strain detecting elements 15a and 15b are respectively arranged in the region between the hole 12a and the hole 12c and the region between the hole 12c and the hole 12b. Since the base substrate 11 is fixed such that the strain detection portions of the frame member 20 are arranged between the fixing portions (in particular, between the hole 12a and the hole 12c, and between the hole 12c and the hole 12b), a load equivalent to the load that is applied to the strain detection portions is applied to the base substrate 11, and the pair of strain detecting elements 15a and 15b can detect the load applied to the base substrate 11.

Also, in the load sensor 10 according to the first embodiment, the input-output terminals 17a to 17d are arranged in the region opposite the pair of strain detecting elements 15a and 15b with respect to the at least one of the holes 12b and 12c. Accordingly, the pair of strain detecting elements 15a and 15b can detect the load applied to the base substrate 11 while the stress applied to the input-output terminals 17a to 17d does not affect the strain detecting element 15a or 15b. As a result, the distance between the input-output terminals 17a to 17d and the pair of strain detecting elements 15a and 15b can be decreased, and the degradation in detection accuracy of the strain detecting elements 15a and 15b, the degradation which may occur due to the stress applied to the input-output terminals 17a to 17d, can be prevented from occurring. Thus, high detection accuracy can be provided while the size of the sensor is decreased.

Further, in the load sensor 10 according to the first embodiment, the pair of reference resistance elements 16a and 16b that form the bridge circuit together with the pair of strain detecting elements 15a and 15b are arranged in the region outside the holes 12a to 12c. Since the base substrate 11 is fixed such that the strain detection portions of the frame member 20 are arranged between the fixing portions (in particular, between the hole 12a and the hole 12c, and between the hole 12c and the hole 12b), a load equivalent to the load that is applied to the strain detection portions of the frame member 20 is applied to the base substrate 11, and the bridge circuit can output the output voltages in accordance with the load applied to the frame member 20. Since the pair of reference resistance elements 16a and 16b are arranged in the region outside the holes 12a to 12c, the reference resistance elements 16a and 16b can provide reference resistance values while the load applied to the frame member 20 does not affect the reference resistance element 16a or 16b. In addition, since the reference resistance elements 16a and 16b are arranged in the region opposite the input-output terminals 17a to 17d with respect to the holes 12a to 12c, the reference resistance elements 16a and 16b can provide reference resistance values while the stress applied to the input-output terminals 17a to 17d does not affect the reference resistance element 16a or 16b.

Figure 4:
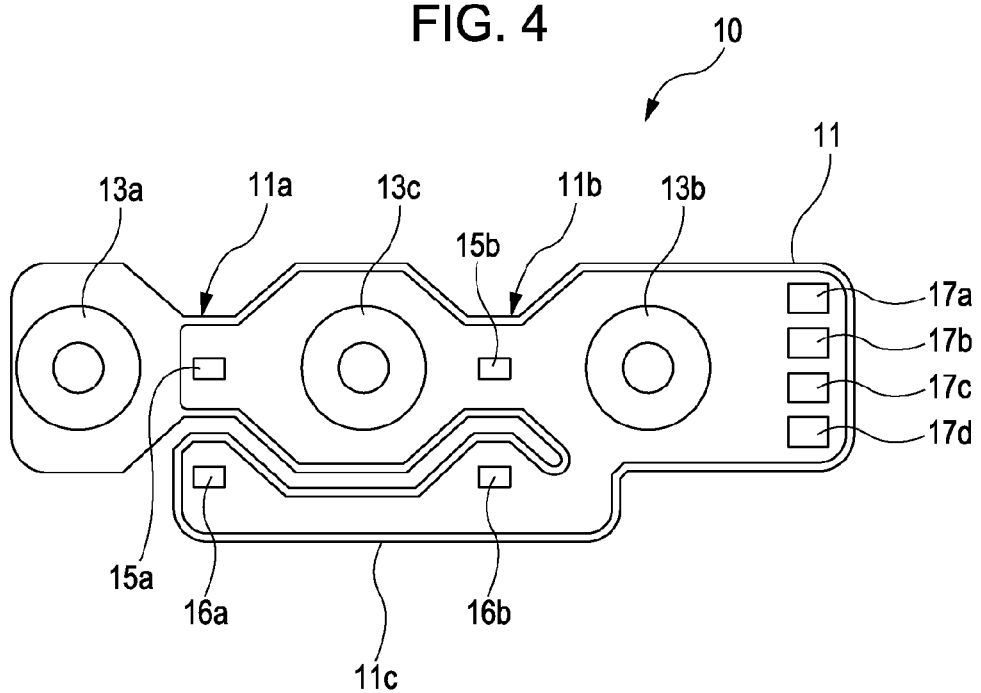
FIG. 4 is a top view showing a modified configuration of the load sensor according to the first embodiment.

In the above description, the pair of reference resistance elements 16a and 16b are arranged in the left region of the hole 12a as shown in FIG. 2A. However, the positions of the pair of reference resistance elements 16a and 16b are not limited thereto, and the positions may be changed properly. The reference resistance elements 16a and 16b may be arranged at any positions as long as the load applied to the frame member 20 serving as the detection object, or the stress applied to the input-output terminals 17a to 17d does not affect the reference resistance element 16a or 16b. FIG. 4 is a top view showing a modified configuration of the load sensor 10 according to the first embodiment. For example, as shown in FIG. 4, an auxiliary piece 11c may extend from a long side of the base substrate 11, and the pair of reference resistance elements 16a and 16b may be arranged on a surface of the auxiliary piece 11c. Even if the embodiment is modified in this way, the load applied to the frame member 20, or the stress applied to the input-output terminals 17a to 17d does not affect the reference resistance element 16a or 16b like the above-described embodiment. Thus, the reference resistance elements 16a and 16b can provide the reference resistance values in the bridge circuit. The bridge circuit can output the output voltages in accordance with the load applied to the frame member 20, and hence high detection accuracy can be provided.

Second Embodiment

A load sensor 30 according to a second embodiment is different from the load sensor 10 according to the first embodiment in that the load sensor 30 may include a base substrate 31 having a bent portion and have a shape bent at the bent portion whereas the load sensor 10 has the shape of a flat plate. Since the load sensor 30 includes the base substrate 31 with the bent shape, the load sensor 30 according to the second embodiment can properly detect a load applied to a detection object having a substantially L-like shape.

Figure 5A:
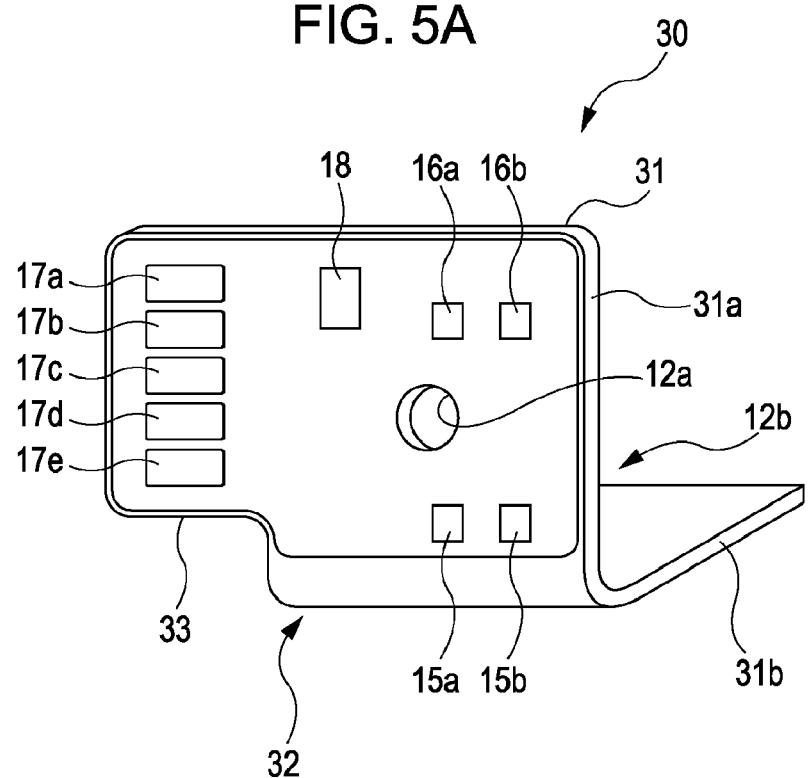
FIG. 5A is a perspective view showing a base substrate included in a load sensor according to a second embodiment of the invention.
Figure 5B:
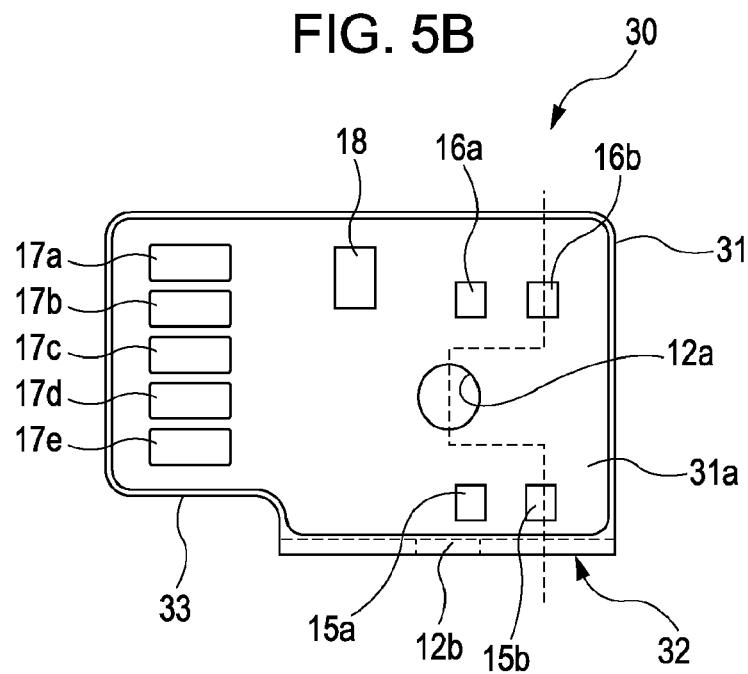
FIG. 5B is a front view showing the base substrate included in the load sensor according to the second embodiment.
Figure 6:
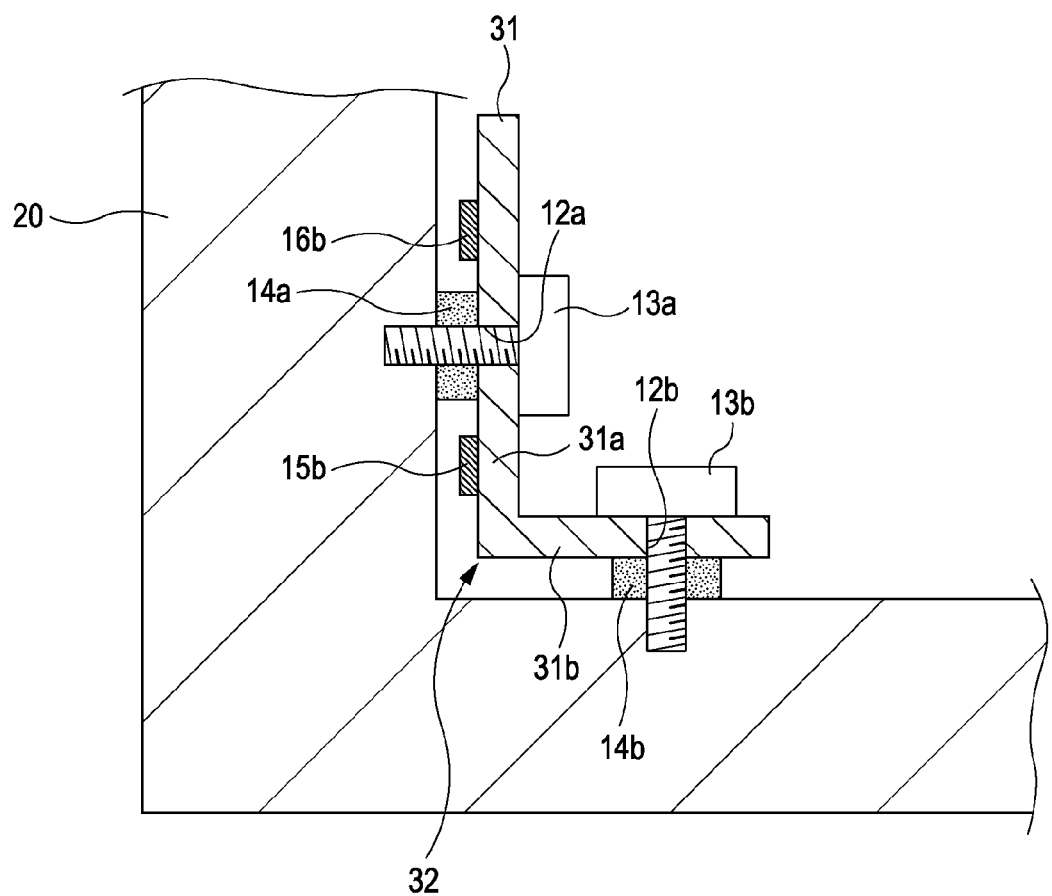
FIG. 6 is a cross-sectional view showing the load sensor according to the second embodiment.

A configuration of the load sensor 30 according to the second embodiment will be described below. FIG. 5A is a perspective view showing the base substrate 31 included in the load sensor 30 according to the second embodiment. FIG. 5B is a front view of the base substrate 31. FIG. 6 is a cross-sectional view showing the load sensor 30 according to the second embodiment. In FIGS. 5A to 6, the same reference signs are applied to configurations equivalent to those of the load sensor 10 according to the first embodiment, and the redundant description will be omitted. FIG. 6 is a cross-sectional view taken along a dotted line in FIG. 5B. FIG. 6 illustrates a frame member 20 for the convenience of description. The frame member 20 serves as a detection object. The load sensor 30 is fixed to the frame member 20.

Referring to FIG. 5A, the base substrate 31 included in the load sensor 30 according to the second embodiment has a bent portion 32 formed at a predetermined position. The base substrate 31 is bent by about 90 degrees, and includes two flat plates facing the frame member 20 and arranged with the bent portion 32 interposed therebetween. More specifically, the base substrate 31 includes a flat plate 31a extending from the bent portion 32 vertically upward, and a flat plate 31b extending from the bent portion 32 horizontally rightward as shown in FIG. 6. The base substrate 31 has a substantially L-like shape defined by the flat plates 31a and 31b. Holes 12a and 12b serving as fixing portions are respectively formed substantially at the centers of the flat plates 31a and 31b. Also, the base substrate 31 includes a protruding portion 33 protruding leftward as shown in FIGS. 5A and 5B. The material and coating material of the base substrate 31 are similar to those of the base substrate 11 according to the first embodiment.

Referring to FIG. 6, the base substrate 31 with this configuration is fixed to the frame member 20 at two positions by screws 13a and 13b through the holes 12a and 12b. Spacers 14a and 14b are disposed between the base substrate 31 and the frame member 20. The spacers 14a and 14b are disposed to separate the base substrate 31 from the frame member 20 by a certain distance. In the load sensor 30 shown in FIG. 6, spacers disposed between the base substrate 31 and the screws 13a and 13b are omitted.

For example, in the load sensor 30 according to the second embodiment, the base substrate 31 is fixed such that a strain detection portion of the frame member 20 is arranged between the fixing portions (in particular, between the hole 12a and the hole 12b). Since the strain detection portion of the frame member 20 is arranged between the fixing portions, the base substrate 31 is deformed with the frame member 20 because the state of the frame member 20 around the strain detection portion is reflected to the base substrate 31. Thus, when a load is applied to the strain detection portion of the frame member 20, a load equivalent to the load that is applied to the frame member 20 is applied to the base substrate 31.

A pair of strain detecting elements 15a and 15b, a pair of reference resistance elements 16a and 16b, and five input-output terminals 17a to 17e are provided on a surface of the flat plate 31a (a surface opposite the frame member 20 shown in FIG. 6). The pair of strain detecting elements 15a and 15b may be arranged in a region that is between the holes 12a and 12b and is near the bent portion 32. The pair of reference resistance elements 16a and 16b may be arranged in a region opposite the bent portion 32 with respect to the hole 12a. The strain detecting elements 15a and 15b are horizontally arranged, and the reference resistance elements 16a and 16b are horizontally arranged, in a right region of the hole 12a as shown in FIGS. 5A and 5B. The input-output terminals 17a to 17e are provided on the protruding portion 33, in a region opposite the pair of strain detecting elements 15a and 15b and the pair of reference resistance elements 16a and 16b with respect to the hole 12a. The input-output terminal 17e defines an input-output terminal corresponding to a thermistor 18 (described later).

As described above, the pair of strain detecting elements 15a and 15b are arranged in the region near the bent portion 32, and the base substrate 31 is fixed such that the strain detection portion of the frame member 20 is arranged between the fixing portions (in particular, between the hole 12a and the hole 12b). Accordingly, a load applied to the strain detection portion of the frame member 20 can be accurately transmitted to the base substrate 31. In addition, since the pair of reference resistance elements 16a and 16b are arranged in the region opposite the bent portion 32 with respect to the hole 12a, the reference resistance elements 16a and 16b can provide reference resistance values in the bridge circuit while a load applied to the frame member 20 does not affect the reference resistance element 16a or 16b.

The pair of strain detecting elements 15a and 15b, the pair of reference resistance elements 16a and 16b, and the input-output terminals 17a to 17c, provided on the surface of the flat plate 31a, form a bridge circuit shown in FIG. 3, like the load sensor 10 according to the first embodiment. Components and wiring of the bridge circuit may be formed by screen printing on the base substrate 31, like the load sensor 10 according to the first embodiment. Since the components and wiring of the bridge circuit are formed by screen printing on the flat plate 31a of the base substrate 31, although the base substrate 31 is bent at the bent portion 32, the bridge circuit can be easily formed on the base substrate 31.

In addition, a thermistor 18 may be provided on the surface of the flat plate 31a, so that the load sensor 30 according to the second embodiment performs temperature correction in accordance with a change in temperature. The thermistor 18 is arranged in a left region of the reference resistance element 16a as shown in FIGS. 5A and 5B. More specifically, the thermistor 18 is arranged in a region that is between the hole 12a and the input-output terminals 17a to 17e and is opposite the bent portion 32 with respect to the hole 12a. The thermistor 18 is arranged on the side of the reference resistance element 16a so that the thermistor 18 can properly detect the temperature while a load applied to the frame member 20 does not affect the thermistor 18. The temperature detected by the thermistor 18 is sent to an external control unit. The control unit uses the temperature for the calculation to correct the load detected by the load sensor 30. Since the correction calculation for the load is performed in accordance with the temperature detected by the thermistor 18 provided on the same surface as the surface with the strain detecting elements 15a and 15b that detect the load applied to the frame member 20, the load applied to the frame member 20 can be accurately detected.

In the load sensor 10 with this configuration, for example, when a load is applied to the frame member 20, the load is transmitted to the base substrate 31 through the screw 13a. In this case, since the pair of strain detecting elements 15a and 15b are arranged in the region that is between the holes 12a and 12b and is near the bent portion 32, a compressive stress or a tensile stress in accordance with the load applied to the frame member 20 may be applied to the strain detecting elements 15a and 15b. Meanwhile, since the pair of reference resistance elements 16a and 16b are arranged in the region opposite the bent portion 32 with respect to the hole 12a, a compressive stress or a tensile stress in accordance with the load applied to the frame member 20 is not applied to the reference resistance element 16a or 16b. Accordingly, output voltages from the output terminals Out1 and Out2 in the bridge circuit shown in FIG. 3 vary in accordance with the compressive stress or the tensile stress applied to the pair of strain detecting elements 15a and 15b. That is, the output voltages from the bridge circuit vary in accordance with the load applied to the frame member 20 with the load sensor 30 fixed thereto.

The input-output terminals 17a to 17e are arranged in the region opposite the pair of strain detecting elements 15a and 15b and the pair of reference resistance elements 16a and 16b with respect to the hole 12a (in the left region of the hole 12a shown in FIGS. 5A and 5B). Accordingly, a stress applied to the input-output terminals 17a to 17e by, for example, wiring work does not affect the strain detecting element 15a or 15b, or the reference resistance element 16a or 16b.

As described above, in the load sensor 30 according to the second embodiment, the two flat plates 31a and 31b facing the frame member 20 and arranged with the bent portion 32 interposed therebetween are provided. The base substrate 31 is fixed to the frame member 20 at the two positions through the holes 12a and 12b in the flat plates 31a and 31b. Also, the pair of strain detecting elements 15a and 15b are arranged in the region that is between the holes 12a and 12b and is near the bent portion 32. Accordingly, since the base substrate 31 is fixed to the frame member 20 such that the strain detection portion of the frame member 20 is arranged between the fixing portions (in particular, between the hole 12a and the hole 12b), a load equivalent to the load that is applied to the strain detection portion of the frame member 20 is applied to the base substrate 31, and the pair of strain detecting elements 15a and 15b can detect the load applied to the base substrate 31.

Also, in the load sensor 30 according to the second embodiment, the input-output terminals 17a to 17e are arranged in the region opposite the pair of strain detecting elements 15a and 15b with respect to the hole 12a. Accordingly, the pair of strain detecting elements 15a and 15b can detect the load applied to the base substrate 31 while a stress applied to the input-output terminals 17a to 17e does not affect the strain detecting element 15a or 15b. As a result, the distance between the input-output terminals 17a to 17e and the pair of strain detecting elements 15a and 15b can be decreased, and the degradation in detection accuracy of the strain detecting elements 15a and 15b, the degradation which may occur due to the stress applied to the input-output terminals 17a to 17d, can be prevented from occurring. Thus, high detection accuracy can be provided while the size of the sensor is decreased.

Further, in the load sensor 30 according to the second embodiment, the pair of reference resistance elements 16a and 16b that form the bridge circuit together with the pair of strain detecting elements 15a and 15b are arranged in the region opposite the bent portion 32 with respect to the hole 12a. Since the base substrate 31 is fixed such that the strain detection portion of the frame member 20 is arranged between the fixing portions (in particular, between the hole 12a and the hole 12b), a load equivalent to the load that is applied to the strain detection portion is applied to the base substrate 31, and the bridge circuit can output the output voltages in accordance with the load applied to the frame member 20. Since the pair of reference resistance elements 16a and 16b are arranged in the region opposite the bent portion 32 with respect to the hole 12a, the reference resistance elements 16a and 16b can provide reference resistance values while the load applied to the frame member 20 does not affect the reference resistance element 16a or 16b. In addition, since the reference resistance elements 16a and 16b are arranged in the region opposite the input-output terminals 17a to 17e with respect to the hole 12a, the reference resistance elements 16a and 16b can provide reference resistance values while the stress applied to the input-output terminals 17a to 17e does not affect the reference resistance element 16a or 16b.

The present invention is not limited to the above-described embodiments, and may be variously modified. The sizes and shapes of the components described in the above embodiments and illustrated in the attached drawings are not limited thereto. Such components and shapes may be changed as long as advantages similar to those of the invention are attained. The invention may be appropriately modified and implemented within the scope of the invention.

What is claimed is:
1. A load sensor comprising:
a base substrate having at least first and second fixing portions to receive first and second fixing members, respectively, which fix the base substrate to a detection object, the first and second fixing portions transmitting a load applied to the detection object to the base substrate via the first and second fixing members, respectively;
a strain detecting element provided on a surface of the base substrate in a region between the first and second fixing portions;
an input-output terminal provided on the surface of the base substrate outside the region between the first and second fixing portions; and
a reference resistance element provided on the surface of the base substrate outside the region between the first and second fixing portions, the reference resistance forming a bridge circuit together with the strain detecting element,
wherein the strain detecting element detects a load corresponding to a load applied to a strain detection portion of the detection object between the first and second fixing members.

2. The load sensor according to claim 1, wherein the reference resistance element is arranged on an opposite side of the input-output terminal with respect to the region between the first and second fixing portions.

3. The load sensor according to claim 1, wherein the strain detecting element, the input-output terminal, and the reference resistance element are formed on a same plane by screen printing.

4. The load sensor according to claim 1, wherein the base substrate includes:
   a bent portion; and
   first and second flat plates extending from the bent portion in a respective direction, each of the first and second flat plates having a surface facing the detection object with a gap provided therebetween by the fixing members,
   wherein the first and second fixing portions are provided on the first and second flat plates, respectively, and
   wherein the strain detecting element, the input-output terminal, and the reference resistance element are provided on the surface of the first flat plate facing the detection object.

5. The load sensor according to claim 4,
   wherein the strain detecting element is arranged in a region between the first fixing portion and the bent portion near the bent portion, and
   wherein the reference resistance element is arranged in a region opposite the bent portion with respect to the first fixing portion.

6. The load sensor according to claim 5, wherein the base substrate has a substantially L-like shape formed by a cross section of the first flat plate, the bent portion, and the second flat plate.

7. The load sensor according to claim 4, further comprising a thermistor on the same surface of the first flat plate having the strain detecting element, the input-output terminal, and the reference resistance element.

8. A load sensor comprising:
   a base substrate having at least first and second fixing portions to receive first and second fixing members, respectively, which fix the base substrate to a detection object, the first and second fixing portions transmitting a load applied to the detection object to the base substrate via the first and second fixing members, respectively;
   a strain detecting element provided on a surface of the base substrate in a region between the first and second fixing portions; and
   an input-output terminal provided on the surface of the base substrate outside the region between the first and second fixing portions,
   wherein the strain detecting element detects a load corresponding to a load applied to a strain detection portion of the detection object between the first and second fixing members,
   and wherein the strain detecting element includes a pair of first and second detecting elements.

9. The load sensor according to claim 8, further comprising:
   a third fixing portion arranged between the first and second detecting elements between the first and second fixing portions, the third fixing portion receiving a third fixing member,
   wherein the first detecting element detects a load corresponding to a first load applied to a first strain detection portion between the first and third fixing members, and the second detecting element detects a second load applied to a second strain detection portion between the third and second fixing members.

* * * * *